(12) United States Patent
Burrow

(10) Patent No.: US 9,513,096 B2
(45) Date of Patent: *Dec. 6, 2016

(54) METHOD OF MAKING A POLYMER AMMUNITION CARTRIDGE CASING

(71) Applicant: True Velocity, Inc., Dallas, TX (US)

(72) Inventor: Lonnie Burrow, Carrollton, TX (US)

(73) Assignee: TRUE VELOCITY, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,326

(22) Filed: May 28, 2015

(65) Prior Publication Data
US 2015/0260495 A1 Sep. 17, 2015

Related U.S. Application Data

(62) Division of application No. 14/011,202, filed on Aug. 27, 2013, which is a division of application No.
(Continued)

(51) Int. Cl.
*F42B 33/00* (2006.01)
*F42B 5/307* (2006.01)
(Continued)

(52) U.S. Cl.
CPC ............... *F42B 33/001* (2013.01); *F42B 5/02* (2013.01); *F42B 5/025* (2013.01); *F42B 5/30* (2013.01);
(Continued)

(58) Field of Classification Search
CPC ............. F42B 5/30; F42B 5/307; F42B 5/313; F42B 5/02; F42B 5/025; F42B 33/00; F42B 33/001; F42B 33/02; F42B 33/04
(Continued)

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| DE | 16742 | 1/1882 |

(Continued)

OTHER PUBLICATIONS

Korean Intellectual Property Office (ISA), International Search Report and Written Opinion for PCT/US2015/038061 dated Sep. 21, 2015, 28 pp.
(Continued)

*Primary Examiner* — James S Bergin
(74) *Attorney, Agent, or Firm* — Chainey P. Singleton; Edwin S. Flores; Chalker Flores, LLP

(57) ABSTRACT

One embodiment of the present invention provides methods of making a polymeric ammunition cartridge. The cartridge includes a substantially cylindrical insert connected to a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole.

6 Claims, 7 Drawing Sheets

Related U.S. Application Data

13/292,843, filed on Nov. 9, 2011, now Pat. No. 8,561,543.

(60) Provisional application No. 61/456,664, filed on Nov. 10, 2010.

(51) Int. Cl.
| | | |
|---|---|---|
| *F42B 5/313* | (2006.01) | |
| *F42B 33/04* | (2006.01) | |
| *F42B 33/02* | (2006.01) | |
| *F42B 5/02* | (2006.01) | |
| *F42B 5/30* | (2006.01) | |

(52) U.S. Cl.
CPC .............. *F42B 5/307* (2013.01); *F42B 5/313* (2013.01); *F42B 33/00* (2013.01); *F42B 33/02* (2013.01); *F42B 33/04* (2013.01)

(58) Field of Classification Search
USPC ....... 102/464, 465, 466, 467, 468, 469, 470; 86/10, 18, 19.5
See application file for complete search history.

(56) References Cited

U.S. PATENT DOCUMENTS

| | | |
|---|---|---|
| 130,679 A | 8/1872 | Whitmore |
| 159,665 A | 2/1875 | Gauthey |
| 169,807 A | 11/1875 | Hart |
| 462,611 A | 11/1891 | Comte de Sparre |
| 498,856 A | 6/1893 | Overbaugh |
| 662,137 A | 11/1900 | Tellerson |
| 676,000 A | 6/1901 | Henneberg |
| 865,979 A | 9/1907 | Bailey |
| 869,046 A | 10/1907 | Bailey |
| 905,358 A | 12/1908 | Peters |
| 957,171 A | 5/1910 | Loeb |
| 963,911 A | 7/1910 | Loeble |
| 1,060,817 A | 5/1913 | Clyne |
| 1,940,657 A | 1/1933 | Woodford |
| 2,294,822 A | 3/1939 | Albree |
| 2,465,962 A | 3/1949 | Allen et al. |
| 2,654,319 A | 10/1953 | Roske |
| 2,823,611 A | 2/1958 | Thayer |
| 2,862,446 A | 12/1958 | Ringdal |
| 3,170,401 A | 9/1962 | Johnson et al. |
| 3,099,958 A | 8/1963 | Daubenspeck et al. |
| 3,292,538 A | 4/1965 | Umbach et al. |
| 3,242,789 A | 3/1966 | Woodring |
| 3,485,170 A | 11/1967 | Scanlon |
| 3,485,173 A | 2/1968 | Morgan |
| 3,609,904 A | 10/1971 | Scanlon |
| 3,659,528 A | 5/1972 | Santala |
| 3,688,699 A | 9/1972 | Horn et al. |
| 3,690,256 A | 9/1972 | Schnitzer |
| 3,745,924 A | 7/1973 | Scanlon |
| 3,756,156 A | 9/1973 | Schuster |
| 3,765,297 A | 10/1973 | Skochko et al. |
| 3,768,413 A | 10/1973 | Ramsay |
| 3,797,396 A | 3/1974 | Reed |
| 3,842,739 A | 10/1974 | Scanlon et al. |
| 3,866,536 A | 2/1975 | Greenberg |
| 3,874,294 A | 4/1975 | Hale |
| 3,955,506 A | 5/1976 | Luther et al. |
| 3,977,326 A | 8/1976 | Anderson et al. |
| 3,990,366 A | 11/1976 | Scanlon |
| 4,020,763 A | 5/1977 | Iruretagoyena |
| 4,147,107 A | 4/1979 | Ringdal |
| 4,157,684 A | 6/1979 | Clausser |
| 4,173,186 A | 11/1979 | Dunham |
| 4,187,271 A | 2/1980 | Rolston et al. |
| 4,228,724 A | 10/1980 | Leich |
| 4,475,435 A | 10/1984 | Mantel |
| 4,598,445 A | 7/1986 | O'Connor |
| 4,679,505 A | 7/1987 | Reed |
| 4,718,348 A | 1/1988 | Ferrigno |
| 4,719,859 A | 1/1988 | Ballreich et al. |
| 4,726,296 A | 2/1988 | Leshner et al. |
| 4,867,065 A | 9/1989 | Kaltmann et al. |
| 5,021,206 A | 6/1991 | Stoops |
| 5,033,386 A | 7/1991 | Vatsvog |
| 5,063,853 A | 11/1991 | Bilgeri |
| 5,090,327 A | 2/1992 | Bilgeri |
| 5,151,555 A | 9/1992 | Vatsvog |
| 5,165,040 A | 11/1992 | Andersson et al. |
| 5,237,930 A | 8/1993 | Belanger et al. |
| 5,247,888 A | 9/1993 | Conil |
| 5,259,288 A | 11/1993 | Vatsvog |
| 5,265,540 A | 11/1993 | Ducros et al. |
| 5,433,148 A | 7/1995 | Barratault et al. |
| 5,535,495 A | 7/1996 | Gutowski |
| 5,563,365 A | 10/1996 | Dineen et al. |
| 5,770,815 A | 6/1998 | Watson, Jr. |
| 5,798,478 A | 8/1998 | Beal |
| 5,950,063 A | 9/1999 | Hens et al. |
| 5,961,200 A | 10/1999 | Friis |
| 5,969,288 A | 10/1999 | Baud |
| 6,004,682 A | 12/1999 | Rackovan et al. |
| 6,048,379 A | 4/2000 | Bray et al. |
| 6,070,532 A | 6/2000 | Halverson |
| 6,272,993 B1 | 8/2001 | Cook et al. |
| 6,283,035 B1 | 9/2001 | Olson et al. |
| 6,357,357 B1 | 3/2002 | Glasser |
| 6,375,971 B1 | 4/2002 | Hansen |
| 6,450,099 B1 | 9/2002 | Desgland |
| 6,460,464 B1 | 10/2002 | Attarwala |
| 6,523,476 B1 | 2/2003 | Riess et al. |
| 6,649,095 B2 | 11/2003 | Buja |
| 6,708,621 B1 | 3/2004 | Forichon-Chaumet et al. |
| 6,752,084 B1 | 6/2004 | Husseini et al. |
| 6,840,149 B2 | 1/2005 | Beal |
| 6,845,716 B2 | 1/2005 | Husseini et al. |
| 7,000,547 B2 | 2/2006 | Amick |
| 7,032,492 B2 | 4/2006 | Meshirer |
| 7,059,234 B2 | 6/2006 | Husseini |
| 7,165,496 B2 | 1/2007 | Reynolds |
| 7,204,191 B2 | 4/2007 | Wiley et al. |
| 7,213,519 B2 | 5/2007 | Wiley et al. |
| 7,232,473 B2 | 6/2007 | Elliott |
| 7,299,750 B2 | 11/2007 | Schikora et al. |
| 7,353,756 B2 | 4/2008 | Leasure |
| 7,380,505 B1 | 6/2008 | Shiery |
| 7,383,776 B2 | 6/2008 | Amick |
| 7,392,746 B2 | 7/2008 | Hansen |
| 7,441,504 B2 | 10/2008 | Husseini et al. |
| 7,585,166 B2 | 9/2009 | Buja |
| 7,610,858 B2 | 11/2009 | Chung |
| 7,750,091 B2 | 7/2010 | Maljkovic et al. |
| 8,056,232 B2 | 11/2011 | Patel et al. |
| 8,156,870 B2 | 4/2012 | South |
| 8,201,867 B2 | 6/2012 | Thomeczek |
| 8,206,522 B2 | 6/2012 | Sandstrom et al. |
| 8,408,137 B2 | 4/2013 | Battablia |
| 8,443,730 B2 | 5/2013 | Padgett |
| 8,511,233 B2 | 8/2013 | Nilsson |
| 8,522,684 B2 | 9/2013 | Davies et al. |
| 8,540,828 B2 | 9/2013 | Busky et al. |
| 8,561,543 B2 | 10/2013 | Burrow |
| 8,573,126 B2 | 11/2013 | Klein et al. |
| 8,641,842 B2 | 2/2014 | Hafner et al. |
| 8,689,696 B1 | 4/2014 | Seeman et al. |
| 8,763,535 B2 | 7/2014 | Padgett |
| 8,790,455 B2 | 7/2014 | Borissov et al. |
| 8,807,008 B2 | 8/2014 | Padgett et al. |
| 8,813,650 B2 | 8/2014 | Maljkovic et al. |
| D715,888 S | 10/2014 | Padgett |
| 8,857,343 B2 | 10/2014 | Marx |
| 8,869,702 B2 | 10/2014 | Padgett |
| 8,875,633 B2 | 11/2014 | Padgett |
| 8,893,621 B1 | 11/2014 | Escobar |
| 8,978,559 B2 | 3/2015 | Davies et al. |
| 9,032,855 B1 | 5/2015 | Foren et al. |
| 9,091,516 B2 | 7/2015 | Davies et al. |

(56) References Cited

U.S. PATENT DOCUMENTS

| | | |
|---|---|---|
| 9,103,641 B2 | 8/2015 | Nielson et al. |
| 9,170,080 B2 | 10/2015 | Poore et al. |
| 9,182,204 B2 | 11/2015 | Maljkovic et al. |
| 9,200,880 B1 | 12/2015 | Foren et al. |
| 9,212,876 B1 | 12/2015 | Kostka et al. |
| 9,212,879 B2 | 12/2015 | Whitworth |
| 9,213,175 B2 | 12/2015 | Arnold |
| 9,254,503 B2 | 2/2016 | Ward |
| 9,255,775 B1 | 2/2016 | Rubin |
| 9,329,004 B2 | 5/2016 | Pace |
| 9,347,457 B2 | 5/2016 | Ahrens et al. |
| 9,377,278 B2 | 6/2016 | Rubin |
| 9,389,052 B2 | 7/2016 | Conroy et al. |
| D764,624 S | 8/2016 | Masinelli |
| D765,214 S | 8/2016 | Padgett |
| 9,429,407 B2 * | 8/2016 | Burrow ............. F42B 33/001 |
| 9,441,930 B2 | 9/2016 | Burrow |
| 2001/0013299 A1 | 8/2001 | Husseini et al. |
| 2003/0217665 A1 | 11/2003 | Rennard |
| 2005/0005807 A1 | 1/2005 | Wiley |
| 2005/0056183 A1 | 3/2005 | Meshirer |
| 2005/0188883 A1 | 9/2005 | Husseini et al. |
| 2005/0257711 A1 | 11/2005 | Husseini et al. |
| 2005/0257712 A1 | 11/2005 | Husseini et al. |
| 2005/0268808 A1 | 12/2005 | Werner |
| 2006/0027129 A1 | 2/2006 | Kolb et al. |
| 2006/0207464 A1 | 9/2006 | Maljkovic et al. |
| 2006/0283314 A1 | 12/2006 | Cesaroni |
| 2007/0214992 A1 | 9/2007 | Dittrich |
| 2009/0183850 A1 | 7/2009 | Morrison et al. |
| 2010/0016518 A1 | 1/2010 | El-Hibri et al. |
| 2010/0258023 A1 | 10/2010 | Reynolds et al. |
| 2010/0300319 A1 | 12/2010 | Guindon |
| 2010/0305261 A1 | 12/2010 | Maljkovic et al. |
| 2011/0016717 A1 | 1/2011 | Morrison et al. |
| 2011/0179965 A1 | 7/2011 | Mason |
| 2011/0226149 A1 | 9/2011 | Tepe et al. |
| 2012/0024183 A1 | 2/2012 | Klein |
| 2012/0180687 A1 | 7/2012 | Padgett et al. |
| 2013/0180392 A1 | 7/2013 | Nuetzman et al. |
| 2014/0060372 A1 | 3/2014 | Padgett |
| 2014/0060373 A1 | 3/2014 | Maljkovic et al. |
| 2014/0076188 A1 | 3/2014 | Maljkovic et al. |
| 2014/0216293 A1 | 8/2014 | Klein et al. |
| 2014/0224144 A1 * | 8/2014 | Neugebauer ............. F42B 5/285 102/470 |
| 2014/0235784 A1 | 8/2014 | Maljkovic et al. |
| 2014/0260925 A1 | 9/2014 | Beach et al. |
| 2014/0345488 A1 | 11/2014 | Schluckebier et al. |
| 2014/0373744 A1 | 12/2014 | Padgett et al. |
| 2015/0007716 A1 | 1/2015 | Macvicar et al. |
| 2015/0033970 A1 | 2/2015 | Maljkovic et al. |
| 2015/0036058 A1 | 2/2015 | Ng et al. |
| 2015/0075400 A1 | 3/2015 | Lemke et al. |
| 2015/0219573 A1 | 8/2015 | Lukay et al. |
| 2015/0226220 A1 | 8/2015 | Bevington |
| 2015/0241183 A1 | 8/2015 | Padgett et al. |
| 2015/0241184 A1 | 8/2015 | Burrow |
| 2015/0260490 A1 | 9/2015 | Burrow |
| 2015/0260491 A1 | 9/2015 | Burrow |
| 2015/0260495 A1 | 9/2015 | Burrow |
| 2015/0360587 A1 | 12/2015 | Hoffmann et al. |
| 2016/0003587 A1 | 1/2016 | Burrow |
| 2016/0003588 A1 | 1/2016 | Burrow |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0102030 A1 | 4/2016 | Coffey et al. |
| 2016/0153757 A1 | 6/2016 | Mahnke |
| 2016/0161232 A1 | 6/2016 | Rubin |
| 2016/0238355 A1 | 8/2016 | Dionne et al. |
| 2016/0245626 A1 | 8/2016 | Drieling et al. |
| 2016/0273896 A1 | 9/2016 | Emary |

FOREIGN PATENT DOCUMENTS

| | | |
|---|---|---|
| EP | 2625486 A1 | 8/2013 |
| GB | 783023 | 9/1957 |
| WO | 0034732 | 6/2000 |
| WO | 2007014024 A2 | 2/2007 |
| WO | 2012047615 A1 | 4/2012 |
| WO | 2012097317 A2 | 7/2012 |
| WO | 2012097320 A1 | 7/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |

OTHER PUBLICATIONS

Korean Intellectual Property Office (ISA), International Search Report and Written Opinion for PCT/US2011/062781 dated Nov. 30, 2012, 16 pp.

Accurateshooter.com Daily Bulletin "New PolyCase Ammunication and Injection-Molded Bullets" Jan. 11, 2015.

* cited by examiner

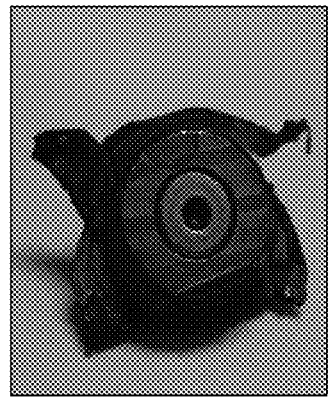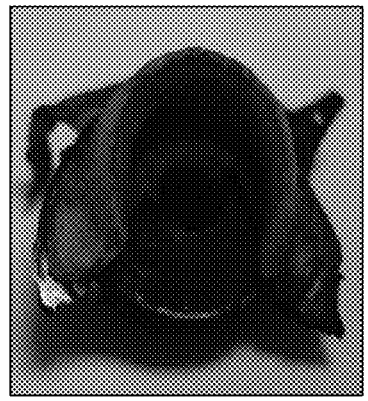
FIG. 4a    FIG. 4b
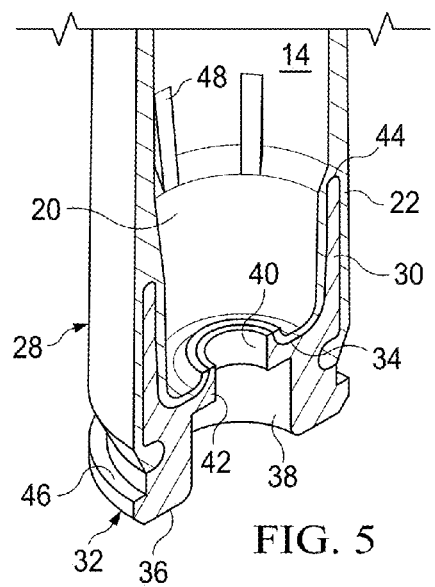
FIG. 5

METHOD OF MAKING A POLYMER AMMUNITION CARTRIDGE CASING

CROSS-REFERENCE TO RELATED APPLICATIONS

This application is a Divisional application of U.S. patent application Ser. No. 14/011,202 filed on Aug. 27, 2013 which is a Divisional application of U.S. patent application Ser. No. 13/292,843 filed on Nov. 9, 2011 (now U.S. Pat. No. 8,561,543) which claims the benefit of U.S. Provisional Patent Application Ser. No. 61/456,664, filed Nov. 10, 2010, the contents of each are hereby incorporated by reference in their entirety.

TECHNICAL FIELD OF THE INVENTION

The present invention relates in general to the field of ammunition, specifically to compositions of matter and methods of making and using polymeric ammunition cartridge casings.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with lightweight polymer cartridge casing ammunition. Conventional ammunition cartridge casings for rifles and machine guns, as well as larger caliber weapons, are made from brass, which is heavy, expensive, and potentially hazardous. There exists a need for an affordable lighter weight replacement for brass ammunition cartridge cases that can increase mission performance and operational capabilities. Lightweight polymer cartridge casing ammunition must meet the reliability and performance standards of existing fielded ammunition and be interchangeable with brass cartridge casing ammunition in existing weaponry. Reliable cartridge casings manufacture requires uniformity (e.g., bullet seating, bullet-to-casing fit, casing strength, etc.) from one cartridge to the next in order to obtain consistent pressures within the casing during firing prior to bullet and casing separation to create uniformed ballistic performance. Plastic cartridge casings have been known for many years but have failed to provide satisfactory ammunition that could be produced in commercial quantities with sufficient safety, ballistic, handling characteristics, and survive physical and natural conditions to which it will be exposed during the ammunition's intended life cycle; however, these characteristics have not been achieved.

For example, U.S. patent application Ser. No. 11/160,682 discloses a base for a cartridge casing body for an ammunition article, the base having an ignition device; an attachment device at one end thereof, the attachment device being adapted to the base to a cartridge casing body; wherein the base is made from plastic, ceramic, or a composite material.

U.S. Pat. No. 7,610,858 discloses an ammunition cartridge assembled from a substantially cylindrical polymeric cartridge casing body defining a casing headspace with an open projectile-end and an end opposing the projectile-end, wherein the casing body has a substantially cylindrical injection molded polymeric bullet-end component with opposing first and second ends, the first end of which is the projectile-end of the casing body and the second end has a male or female coupling element; and a cylindrical polymeric middle body component with opposing first and second ends, wherein the first end has a coupling element that is a mate for the projectile-end coupling element and joins the first end of the middle body component to the second end of the bullet-end component, and the second end is the end of the casing body opposite the projectile end and has a male or female coupling element; and a cylindrical cartridge casing head-end component with an essentially closed base end with a primer hole opposite an open end with a coupling element that is a mate for the coupling element on the second end of the middle body and joins the second end of the middle body component to the open end of the head-end component; wherein the middle body component is formed from a material more ductile than the material head-end component is formed from but equal or less ductile than the material the bullet-end component is formed from. Methods for assembling ammunition cartridges and ammunition cartridges having the headspace length larger than the corresponding headspace length of the chamber of the intended weapon measured at the same basic diameter for the cartridge casing without being so large as to jam the weapon or otherwise interfere with its action are also disclosed.

Shortcomings of the known methods of producing plastic or substantially plastic ammunition include the possibility of the projectile being pushed into the cartridge casing, the bullet pull being too light such that the bullet can fall out, the bullet pull being too insufficient to create sufficient chamber pressure, the bullet pull not being uniform from round to round, and portions of the cartridge casing breaking off upon firing causing the weapon to jam or damage or danger when subsequent rounds are fired or when the casing portions themselves become projectiles. To overcome the above shortcomings, improvements in cartridge case design and performance polymer materials are needed.

BRIEF SUMMARY OF THE INVENTION

One embodiment of the present invention provides a polymeric ammunition cartridge. The cartridge includes a substantially cylindrical insert connected to a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole. Other embodiments include the primer inserted into the primer recess, the charge located in the powder chamber, and/or a bullet or projectile.

In one embodiment the substantially cylindrical polymeric middle body is formed from a ductile polymer, more preferably a nylon polymer. In one embodiment the substantially cylindrical polymeric middle body is formed from a fiber-reinforced polymeric composite. In one embodiment the fiber-reinforced polymeric composite contains between about 10 and about 70 wt % glass fiber fillers, mineral fillers, or mixtures thereof. In one embodiment the substantially cylindrical polymeric bullet-end and bullet are further welded or bonded together.

The substantially cylindrical polymeric bullet-end may include a forward opening end having a first and a second mechanical interlock for engagement between the forward opening end and a bullet. In one embodiment the forward opening end includes two or more cannelures formed on an outer circumferential surface of the forward opening end. In one embodiment the forward opening end comprises one, two or more annular rings that mate with one, two or more corresponding annular grooves positioned on the bullet. The forward opening end is crimped so that a polymeric material flows into an annular groove of a bullet. In one embodiment the bullet is adhesively fitted to the forward opening end; however, in other embodiment, the bullet is fitted to the forward opening end by welding or bonding together using solvent, adhesive, spin-welding, vibration-welding, ultrasonic-welding or laser-welding techniques.

In one embodiment the substantially cylindrical polymeric bullet-end includes a cannelure or mechanical interlock for engagement between the forward opening end and a bullet at the shoulder end of the forward opening end. Although the mechanical interlock is located in the lower portion of the bullet at the shoulder end it may also be located at any position from the entrance or the end of the cylindrical polymeric bullet-end. Furthermore, the mechanical interlock/cannelure may include 1, 2, 3, 4, 5, or more mechanical interlocks/cannelures. The substantially cylindrical polymeric bullet-end may be connected to the bullet through an adhesive or weld. In addition, a combination of adhesives or welds, etc and 1, 2, 3, 4, 5, or more mechanical interlocks/cannelures may be used.

The substantially cylindrical polymeric bullet-end may include a forward opening end having a first and a second mechanical interlock for engagement between the forward opening end and a bullet. In one embodiment the forward opening end includes two or more cannelures formed on an outer circumferential surface of the forward opening end. In one embodiment the forward opening end comprises one, two or more annular rings that mate with one, two or more corresponding annular grooves positioned on the bullet. The forward opening end is crimped so that a polymeric material flows into an annular groove of a bullet. In one embodiment the bullet is adhesively fitted to the forward opening end; however, in other embodiment, the bullet is fitted to the forward opening end by welding or bonding together using solvent, adhesive, spin-welding, vibration-welding, ultrasonic-welding or laser-welding techniques.

In one embodiment the substantially cylindrical polymeric middle body includes a polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

The forward opening end comprises a neck with a plurality of internal structures for supporting a bullet. The substantially cylindrical coupling element is a male coupling element with a straight skirt interlock surface that tapers to a smaller diameter at the forward portion on the skirt tip to mate with a female coupling element of the substantially cylindrical polymeric coupling end. In one embodiment the polymeric ammunition cartridge further includes a diffuser positioned in the primer recess comprising a diffuser flash hole aligned with the primer flash hole.

Another embodiment of the polymeric ammunition cartridge having a diffuser of the present invention includes a substantially cylindrical insert, a diffuser, and a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The diffuser positioned in the primer recess comprising a diffuser flash hole aligned with the primer flash hole. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole. The diffuser has a primer flash hole with a flash hole lip extending into a bore of the primer flash hole.

Another embodiment of the polymeric ammunition cartridge of the present invention includes a substantially cylindrical insert having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface; a substantially cylindrical polymeric middle body comprising a substantially cylindrical polymeric bullet-end and a substantially cylindrical polymeric coupling end connected by a powder chamber, wherein the substantially cylindrical polymeric coupling end extends over the substantially cylindrical coupling element and covers an circumferential surface of the primer flash hole; and a substantially cylindrical polymeric bullet-end upper portion comprising a bullet-end coupling element connected to the substantially cylindrical polymeric bullet-end and a forward opening end to engage a bullet.

Another embodiment of the polymeric ammunition cartridge of the present invention includes a metal insert for a polymeric ammunition cartridge having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. In other embodiments the polymeric ammunition cartridge, further includes a diffuser positioned in the primer recess comprising a diffuser flash hole aligned with the primer flash hole.

Another embodiment of the polymeric ammunition cartridge of the present invention includes a polymer insert for a polymeric ammunition cartridge having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. In other embodiments the polymeric ammunition cartridge, further includes a diffuser positioned in the primer recess.

Still another embodiment includes a method of forming a polymeric ammunition cartridge by providing a substantially cylindrical insert having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface, forming a substantially cylindrical polymeric middle body comprising a substantially cylindrical polymeric bullet-end and a substantially cylindrical polymeric coupling end connected by a powder chamber, connecting the substantially cylindrical polymeric coupling end to the substantially cylindrical coupling element; and covering circumferentially an interior surface of the primer flash hole. The method further includes the step of positioning a diffuser comprising a diffuser flash hole in the primer recess and aligning the diffuser flash hole with the primer flash hole.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which:

FIGS. 4a and 4b depict images of a catastrophic failure of the polymeric cartridge case of FIG. 3;

FIG. 5 depicts a side, cross-sectional view of a portion of the polymeric cartridge case displaying ribs according to one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Reliable cartridge manufacture requires uniformity from one cartridge to the next in order to obtain consistent ballistic performance. Among other considerations, proper bullet seating and bullet-to-casing fit is required. In this manner, a desired pressure develops within the casing during firing prior to bullet and casing separation. Historically, bullets employ a cannelure, which is a slight annular depression formed in a surface of the bullet at a location determined to be the optimal seating depth for the bullet. In this manner, a visual inspection of a cartridge could determine whether or not the bullet is seated at the proper depth. Once the bullet is inserted into the casing to the proper depth, one of two standard procedures is incorporated to lock the bullet in its proper location. One method is the crimping of the entire end of the casing into the cannelure. A second method does not crimp the casing end; rather the bullet is pressure fitted into the casing.

The polymeric ammunition cartridges of the present invention are of a caliber typically carried by soldiers in combat for use in their combat weapons. The present invention is not limited to the described caliber and is believed to be applicable to other calibers as well. This includes various small and medium caliber munitions, including 5.56 mm, 7.62 mm and 0.50 caliber ammunition cartridges, as well as medium/small caliber ammunition such as 380 caliber, 38 caliber, 9 mm, 10 mm, 20 mm, 25 mm, 30 mm, 40 mm, 45 caliber and the like. The cartridges, therefore, are of a caliber between about 0.05 and about 5 inches. Thus, the present invention is also applicable to the sporting goods industry for use by hunters and target shooters.

Figure 1:
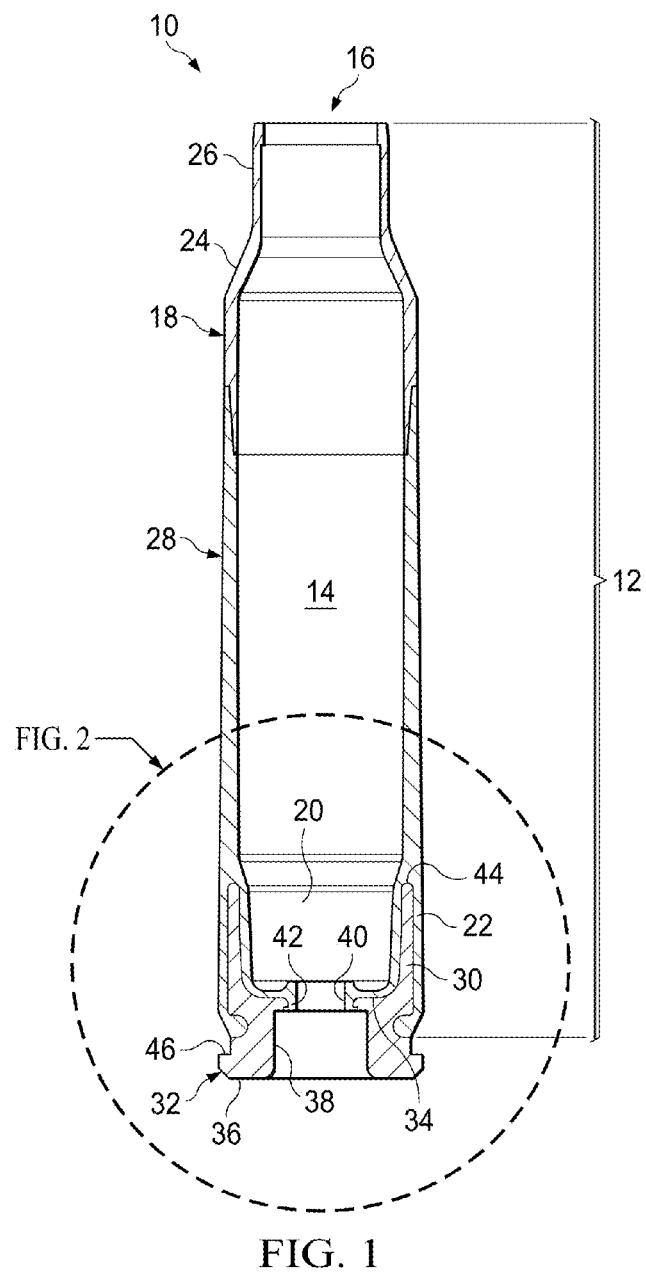
FIG. 1 depicts a side, cross-sectional view of a polymeric cartridge case according to one embodiment of the present invention.

FIG. 1 depicts a side, cross-sectional view of a polymeric cartridge case according to one embodiment of the present invention. A cartridge 10 suitable for use with high velocity rifles is shown manufactured with a polymer casing 12 showing a powder chamber 14 with projectile (not shown)

inserted into the forward end opening 16. Polymer casing 12 has a substantially cylindrical open-ended polymeric bullet-end 18 extending from forward end opening 16 rearward to opposite end 20. The bullet-end component 18 may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26. The bullet-end component typically has a wall thickness between about 0.003 and about 0.200 inches and more preferably between about 0.005 and more preferably between about 0.150 inches about 0.010 and about 0.050 inches.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The middle body component extends from a forward end opening 16 to coupling element 22. The middle body component typically has a wall thickness between about 0.003 and about 0.200 inches and more preferably between about 0.005 and more preferably between about 0.150 inches about 0.010 and about 0.050 inches.

The bullet-end 16, middle body 18 and bottom surface 34 define the interior of powder chamber 14 in which the powder charge (not shown) is contained. The interior volume of powder chamber 14 may be varied to provide the volume necessary for complete filling of the chamber 14 by the propellant chosen so that a simplified volumetric measure of propellant can be utilized when loading the cartridge. Either a particulate or consolidated propellant can be used.

The substantially cylindrical insert 32 also has a flange 46 cut therein and a primer recess 38 formed therein for ease of insertion of the primer (not shown). The primer recess 38 is sized so as to receive the primer (not shown) in an interference fit during assembly. A primer flash hole 40 communicates through the bottom surface 34 of substantially cylindrical insert 32 into the powder chamber 14 so that upon detonation of primer (not shown) the powder in powder chamber 14 will be ignited.

Projectile (not shown) is held in place within chamber case neck 26 at forward opening 16 by an interference fit. Mechanical crimping of the forward opening 16 can also be applied to increase the bullet pull force. The bullet (not shown) may be inserted into place following the completion of the filling of powder chamber 14. Projectile (not shown) can also be injection molded directly onto the forward opening 16 prior to welding or bonding together using solvent, adhesive, spin-welding, vibration-welding, ultrasonic-welding or laser-welding techniques. The welding or bonding increases the joint strength so the casing can be extracted from the hot gun casing after firing at the cook-off temperature.

The bullet-end and bullet components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature. An optional first and second annular grooves (cannelures) may be provided in the bullet-end in the interlock surface of the male coupling element to provide a snap-fit between the two components. The cannelures formed in a surface of the bullet at a location determined to be the optimal seating depth for the bullet. Once the bullet is inserted into the casing to the proper depth to lock the bullet in its proper location. One method is the crimping of the entire end of the casing into the cannelures.

The bullet-end and middle body components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature.

Figure 2:
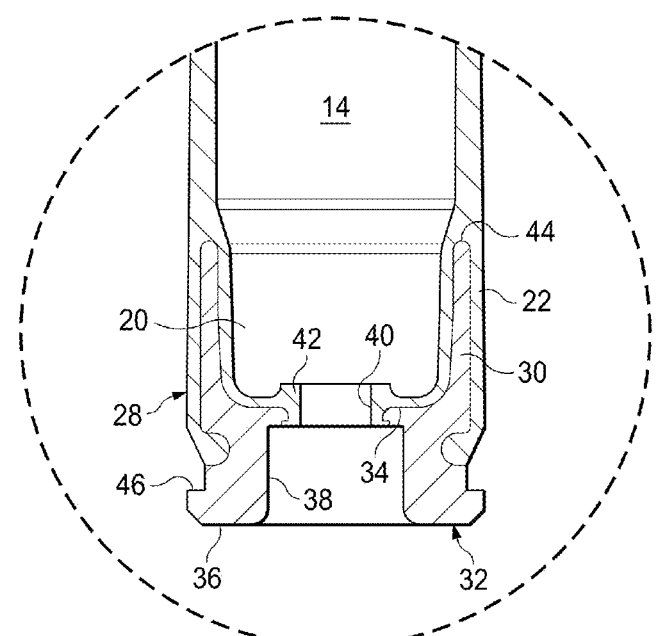
FIG. 2 depicts a side, cross-sectional view of a portion of the polymeric cartridge case according to one embodiment of the present invention.

FIG. 2 depicts a side, cross-sectional view of a portion of the polymeric cartridge case according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer recess 28 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28.

Figure 3:
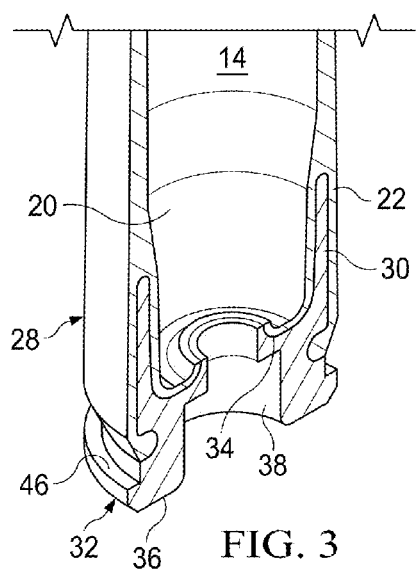
FIG. 3 depicts a side, cross-sectional view of a portion of the polymeric cartridge case lacking the aperture coating.

FIG. 3 depicts a side, cross-sectional view of a portion of the polymeric cartridge case lacking the aperture coating (not shown).

FIGS. 4a and 4b depict images of a catastrophic failure of the polymeric cartridge case of FIG. 3. Other polymeric cartridge case was tested and resulted in catastrophic failure with the rounds blowing the magazine out of the weapon and fragmenting the metal insert and lodging the polymer case in the chamber. The examination of the catastrophic failure revealed the tearing of the polymer at the top of the insert. As a result, in some embodiments the height of the insert was reduced by 0.020" to reduce the tearing and frequency of catastrophic failures. Further examination, revealed that the polymer at the flash hole of the base was separating from the insert. One embodiment locks the polymer into the flash hole by extending the polymer into the flash hole. In addition, the raised area was removed, the diameter of the flash hole was opened, and the primer side was counter bored. Other embodiments may incorporate all, one, or a combination of 2 or more of these elements to stop the gas from separating the polymer from the insert that was creating combustion between the insert and the polymer.

FIG. 5 depicts a side, cross-sectional view of a portion of the polymeric cartridge case displaying ribs according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30, extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore.

Figure 6:
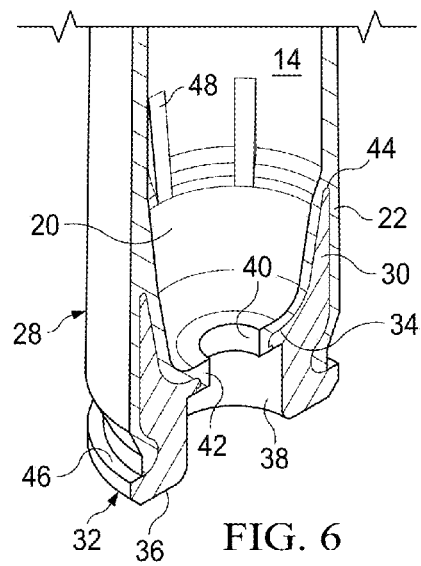
FIG. 6 depicts a side, cross-sectional view of a portion of the polymeric cartridge case displaying ribs according to one embodiment of the present invention.

FIG. 6 depicts a side, cross-sectional view of a portion of the polymeric cartridge case displaying ribs according to one embodiment of the present invention. One embodiment that reduces bellowing of the insert includes a shortened insert and angled coupling element 30 inside of the insert. In addition, the raised portion of the polymer at the flash hole was removed, the internal polymer wall was lowered and angled to match the insert and the internal ribs were lengthened.

A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore. Another embodiment of the instant invention is a shortened insert and angled coupling element 30 inside of the insert. In addition, raised portions of the polymer at the flash hole, lowered and angled the internal polymer wall to match the insert and lengthened the internal ribs.

Figure 7:
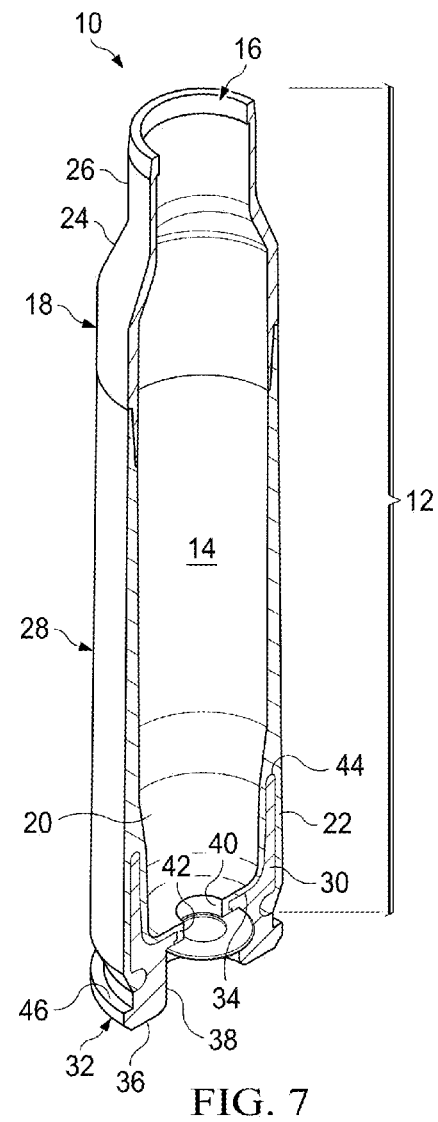
FIG. 7 depicts a side, cross-sectional view of a polymeric cartridge case having a diffuser according to one embodiment of the present invention.

FIG. 7 depicts a side, cross-sectional view of a polymeric cartridge case having a diffuser according to one embodiment of the present invention. The diffuser 50 is a device that is used to divert the affects of the primer off of the polymer and directing it to the flash hole. The affects being the impact from igniting the primer as far as pressure and heat. A cartridge 10 suitable for use with high velocity rifles is shown manufactured with a polymer casing 12 showing a powder chamber 14 with projectile (not shown) inserted into the forward end opening 16. Polymer casing 12 has a substantially cylindrical open-ended polymeric bullet-end 18 extending from forward end opening 16 rearward to the opposite end 20. The bullet-end component 18 may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provides support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The middle body component extends from a forward end opening 16 to coupling element 22. Located in the top surface 36 is a primer recess 38 that extends toward the bottom surface 34 with a diffuser 50 positioned in the primer recess 38. The diffuser 50 includes a diffuser aperture 52 that aligns with the primer flash hole 40. The diffuser 50 is a device that is used to divert the affects of the primer (not shown) off of the polymer. The affects being the impact from igniting the primer as far as pressure and heat to divert the energy of the primer off of the polymer and directing it to the flash hole.

Figure 8:
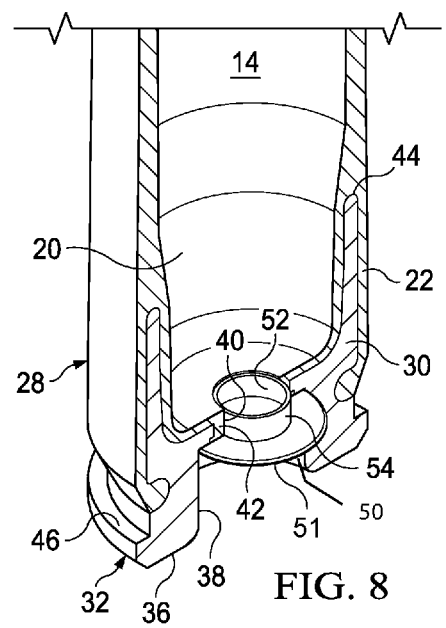
FIG. 8 depicts a side, cross-sectional view of a portion of the polymeric cartridge case having a diffuser according to one embodiment of the present invention.
Figure 9A:
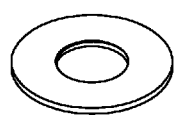
FIGS. 9a-9h depict diffuser according to a different embodiment of the present invention.
Figure 9B:
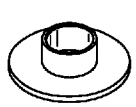
Figure 9C:
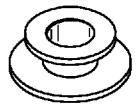
Figure 9D:
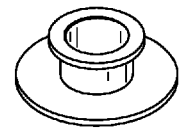
Figure 9E:
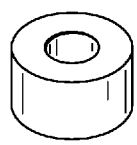
Figure 9F:
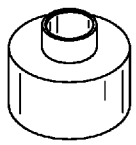
Figure 9G:
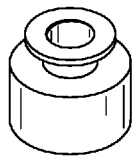
Figure 9H:
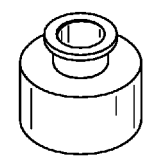

FIG. 8 depicts a side, cross-sectional view of a portion of the polymeric cartridge case having a diffuser according to one embodiment of the present invention. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer flash hole 40 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provides support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. Located in the top surface 36 is a primer recess 38 that extends toward the bottom surface 34 with a diffuser 50 positioned in the primer recess 38. The diffuser 50 includes a lip 51 that includes a diffuser aperture 52 and a diffuser aperture extension 54 that aligns with the primer flash hole 40. The diffuser 50 is a device that is used to divert the affects of the primer (not shown) off of the polymer. The affects being the impact from igniting the primer as far as pressure and heat to divert the energy of the primer off of the polymer and directing it to the flash hole. The diffuser 50 can be between 0.004 to 0.010 inches in thickness and made from half hard brass. For example, the diffuser 50 can be between 0.005 inches thick for a 5.56 diffuser 50. The OD of the diffuser for a 5.56 or 223 case is 0.173 and the ID is 0.080. The Diffuser could be made of any material that can withstand the energy from the ignition of the primer. This would include steel, stainless, cooper, aluminum or even an engineered resin that was injection molded or stamped. The Diffuser can be produce in T shape by drawing the material with a stamping and draw die. In the T Diffuser the center ring can be 0.005 to 0.010 tall and the OD is 0.090 and the ID 0.080.

FIGS. 9a-9h depict different embodiment of the diffuser of the present invention.

Figure 10:
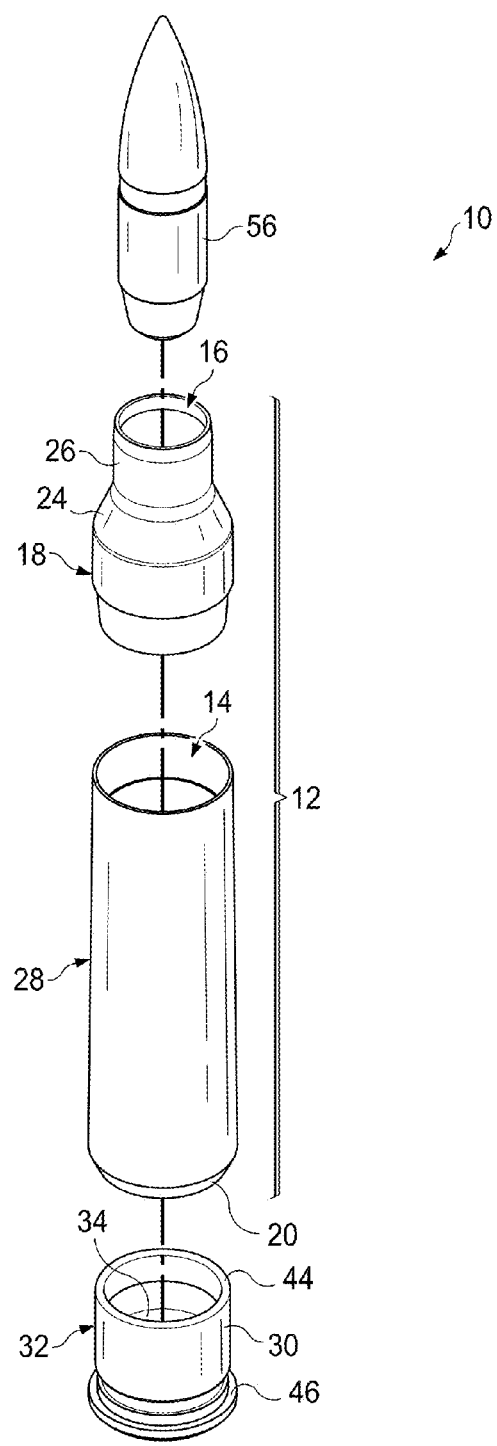
FIG. 10 depicts an exploded view of the polymeric cartridge casing.

FIG. 10 depicts an exploded view of the polymeric cartridge casing. A cartridge 10 suitable for use with high velocity rifles is shown manufactured with a middle body component 28 having a substantially cylindrical open-ended polymeric bullet-end 18. The substantially cylindrical open-ended polymeric bullet-end 18 has a shoulder 24 forming chamber neck 26 and a bullet 56 inserted therein. The substantially cylindrical insert 32 also has a flange 46 cut therein and a primer recess (not shown) formed therein for ease of insertion of the primer (not shown).

Figure 11:
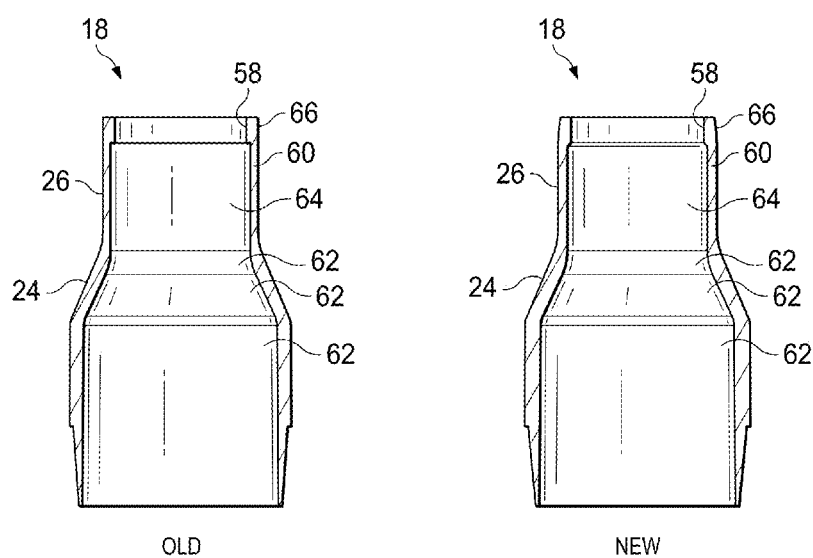
FIG. 11 depicts a view of the substantially cylindrical open-ended polymeric bullet-end having a shoulder forming chamber neck and a bullet.

FIG. 11 depicts a view of the substantially cylindrical open-ended polymeric bullet-end 18 has a shoulder 24 forming chamber neck 26 and a bullet (not shown). One embodiment includes modifications to strengthen the neck of the mouth 60 and to the internal base area 62 to reduce nose tearing and lodging in the chamber. The substantially cylindrical open-ended polymeric bullet-end 18 illustrates a lock 58 (e.g., 0.030×0.003) and added a step to allow for the lock 58 to flex out during firing. Polymer was added to the external area to strengthen the neck of the mouth 60 and to the internal base area 62. The interference of the bullet to the neck was increased by adding polymer to the inside of the neck 64 and the exit lock modified by adding an angle to the rim 66.

The polymeric and composite casing components may be injection molded. Polymeric materials for the bullet-end and middle body components must have propellant compatibility and resistance to gun cleaning solvents and grease, as well as resistance to chemical, biological and radiological agents. The polymeric materials must have a temperature resistance higher than the cook-off temperature of the propellant, typically about 320° F. The polymeric materials must have elongation-to-break values that to resist deformation under interior ballistic pressure as high as 60,000 psi in all environments (temperatures from about −65 to about 320° F. and humidity from 0 to 100% RH). According to one embodiment, the middle body component is either molded onto or snap-fit to the casing head-end component after which the bullet-end component is snap-fit or interference fit to the middle body component. The components may be formed from high-strength polymer, composite or ceramic.

Examples of suitable high strength polymers include composite polymer material including a tungsten metal powder, nylon 6/6, nylon 6, and glass fibers; and a specific gravity in a range of 3-10. The tungsten metal powder may be 50%-96% of a weight of the bullet body. The polymer material also includes about 0.5-15%, preferably about 1-12%, and most preferably about 2-9% by weight, of nylon 6/6, about 0.5-15%, preferably about 1-12%, and most preferably about 2-9% by weight, of nylon 6, and about 0.5-15%, preferably about 1-12%, and most preferably about 2-9% by weight, of glass fibers. It is most suitable that each of these ingredients be included in amounts less than 10% by weight. The cartridge casing body may be made of a modified ZYTEL resin, available from E.I. DuPont De Nemours Co., a modified 612 nylon resin, modified to increase elastic response.

Examples of suitable polymers include polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids. Examples of suitable polymers also include aliphatic or aromatic polyamide, polyeitherimide, polysulfone, polyphenylsulfone, poly-phenylene oxide, liquid crystalline polymer and polyketone. Examples of suitable composites include polymers such as polyphenylsulfone reinforced with between about 30 and about 70 wt %, and preferably up to about 65 wt % of one or more reinforcing materials selected from glass fiber, ceramic fiber, carbon fiber, mineral fillers, organo nanoclay, or carbon nanotube. Preferred reinforcing materials, such as chopped surface-treated E-glass fibers provide flow characteristics at the above-described loadings comparable to unfilled polymers to provide a desirable combination of strength and flow characteristics that permit the molding of head-end components. Composite components can be formed by machining or injection molding. Finally, the cartridge case must retain sufficient joint strength at cook-off temperatures. More specifically, polymers suitable for molding of the projectile-end component have one or more of the following properties: Yield or tensile strength at −65° F.>10, 000 psi Elongation-to-break at −65° F.>15% Yield or tensile strength at 73° F.>8,000 psi Elongation-to-break at 73° F.>50% Yield or tensile strength at 320° F.>4,000 psi Elongation-to-break at 320° F.>80%. Polymers suitable for molding of the middle-body component have one or more of the following properties: Yield or tensile strength at −65° F.>10,000 psi Yield or tensile strength at 73° F.>8,000 psi Yield or tensile strength at 320° F.>4,000 psi.

Commercially available polymers suitable for use in the present invention thus include polyphenylsulfones; copolymers of polyphenylsulfones with polyether-sulfones or polysulfones; copolymers and blends of polyphenylsulfones with polysiloxanes; poly(etherimide-siloxane); copolymers and blends of polyetherimides and polysiloxanes, and blends of polyetherimides and poly(etherimide-siloxane) copolymers; and the like. Particularly preferred are polyphenylsulfones and their copolymers with poly-sulfones or polysiloxane that have high tensile strength and elongation-to-break to sustain the deformation under high interior ballistic pressure. Such polymers are commercially available, for example, RADEL R5800 polyphenylesulfone from Solvay Advanced Polymers. The polymer can be formulated with up to about 10 wt % of one or more additives selected from internal mold release agents, heat stabilizers, anti-static agents, colorants, impact modifiers and UV stabilizers.

The polymers of the present invention can also be used for conventional two-piece metal-plastic hybrid cartridge case designs and conventional shotgun shell designs. One example of such a design is an ammunition cartridge with a one-piece substantially cylindrical polymeric cartridge casing body with an open projectile-end and an end opposing the projectile-end with a male or female coupling element; and a cylindrical metal cartridge casing head-end component with an essentially closed base end with a primer hole opposite an open end having a coupling element that is a mate for the coupling element on the opposing end of the polymeric cartridge casing body joining the open end of the head-end component to the opposing end of the polymeric cartridge casing body. The high polymer ductility permits the casing to resist breakage.

One embodiment includes a 2 cavity prototype mold having an upper portion and a base portion for a 5.56 case having a metal insert over-molded with a Nylon 6 (polymer) based material. In this embodiment the polymer in the base includes a lip or flange to extract the case from the weapon. One 2-cavity prototype mold to produce the upper portion of the 5.56 case can be made using a stripper plate tool using an Osco hot spur and two subgates per cavity. Another embodiment includes a subsonic version, the difference from the standard and the subsonic version is the walls are thicker thus requiring less powder. This will decrease the velocity of the bullet thus creating a subsonic round.

The extracting inserts is used to give the polymer case a tough enough ridge and groove for the weapons extractor to grab and pull the case out the chamber of the gun. The extracting insert is made of 17-4 ss that is hardened to 42-45 rc. The insert may be made of aluminum, brass, cooper, steel or even an engineered resin with enough tensile strength.

The insert is over molded in an injection molded process using a nano clay particle filled Nylon material. The inserts can be machined or stamped. In addition, an engineered resin able to withstand the demand on the insert allows injection molded and/or even transfer molded.

One of ordinary skill in the art will know that many propellant types and weights can be used to prepare workable ammunition and that such loads may be determined by a careful trial including initial low quantity loading of a given propellant and the well known stepwise increasing of a given propellant loading until a maximum acceptable load is achieved. Extreme care and caution is advised in evaluating new loads. The propellants available have various burn rates and must be carefully chosen so that a safe load is devised.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of forming a polymeric ammunition cartridge comprising the steps of:
   providing a substantially cylindrical primer insert comprising
      a base having a top surface opposite a bottom surface;
      a substantially cylindrical coupling flange that extends from the top surface forming a substantially cylindrical inner surface;
      a substantially cylindrical primer wall that extends from the bottom surface wherein a substantially cylindrical primer recess is formed by the inner surface of the substantially cylindrical primer wall and a groove formed on the circumference of an outer surface of the substantially cylindrical primer wall;
      wherein the substantially cylindrical inner surface is opposite the substantially cylindrical primer recess;
      a primer aperture formed through the base to connect the substantially cylindrical inner surface to the substantially cylindrical primer recess; and
      a flash hole groove formed about the primer aperture on the bottom surface; and
   forming a substantially cylindrical polymeric middle body having the substantially cylindrical primer insert at a first end and a substantially cylindrical polymeric coupling region at a second end by contacting a polymeric material with the substantially cylindrical primer insert, wherein the polymeric material covers the substantially cylindrical coupling flange and extends over the substantially cylindrical inner surface to the flash hole groove to form a primer flash hole and extends over the outer surface of the substantially cylindrical primer wall to the groove; wherein a propellant chamber extends from the substantially cylindrical polymeric coupling region to the primer flash hole;
   providing a substantially cylindrical polymeric bullet-end comprising a substantially cylindrical polymeric coupling end opposite a bullet aperture; and
   connecting the substantially cylindrical polymeric coupling region to the substantially cylindrical polymeric coupling end to form a propellant chamber from the bullet aperture to the primer flash hole.

2. The method of claim 1, wherein the substantially cylindrical polymeric bullet-end comprises a shoulder positioned between the substantially cylindrical polymeric coupling end and the bullet aperture.

3. The method of claim 1, wherein the bullet aperture further comprises a cantilever ring.

4. The method of claim 1, further comprising the step of inserting a primer into the substantially cylindrical primer recess.

5. The method of claim 1, further comprising the step of providing a diffuser ring having a diffuser ring aperture with a lip that extends at least partially into the primer flash hole.

6. The method of claim 1, further comprising the step of providing a diffuser ring having a diffuser ring aperture with a lip that extends through the primer flash hole.

* * * * *